(12) United States Patent
Ragnarsson et al.

(10) Patent No.: US 11,583,867 B2
(45) Date of Patent: Feb. 21, 2023

(54) SELF-POWERED CONCRETE/STEEL STRUCTURE DISASSEMBLING APPARATUS

(71) Applicants: Anders Ragnarsson, Chester, NH (US); Gustaf Thormalm, Holsbybrunn (SE)

(72) Inventors: Anders Ragnarsson, Chester, NH (US); Gustaf Thormalm, Holsbybrunn (SE)

(*) Notice: Subject to any disclaimer, the term of this patent is extended or adjusted under 35 U.S.C. 154(b) by 129 days.

(21) Appl. No.: 16/902,502

(22) Filed: Jun. 16, 2020

(65) Prior Publication Data

US 2021/0387204 A1    Dec. 16, 2021

(51) Int. Cl.
*B02C 21/02* (2006.01)
*B02C 1/00* (2006.01)
(Continued)

(52) U.S. Cl.
CPC ............ *B02C 21/026* (2013.01); *B02C 1/005* (2013.01); *B02C 1/06* (2013.01); *B23D 17/06* (2013.01);
(Continued)

(58) Field of Classification Search
CPC ..... B02C 1/06; B02C 21/026; B02C 2201/02; E04G 23/082; B23D 17/06; B66C 17/00; B66C 17/04; Y10T 225/371; F15B 15/18
(Continued)

(56) References Cited

U.S. PATENT DOCUMENTS

| 4,720,032 A | * | 1/1988 | LaBounty | ............... E02F 3/965 225/103 |
| 5,630,538 A | * | 5/1997 | Hatakeyama | .......... B22D 31/00 164/262 |

(Continued)

FOREIGN PATENT DOCUMENTS

| EP | 2787148 A1 * 10/2014 | ................ E02F 3/58 |
| JP | H02295895 A * 12/1990 | |

(Continued)

OTHER PUBLICATIONS

English translate (JPH02295895A), retrieved date Jan. 6, 2022.*
(Continued)

*Primary Examiner* — Adam J Eiseman
*Assistant Examiner* — Mohammed S. Alawadi
(74) *Attorney, Agent, or Firm* — Finch & Maloney, PLLC (57) ABSTRACT

A concrete/steel structure disassembling apparatus which comprises a triangular or T-shaped housing, and a suspension member is pivotably coupled to the triangular or T-shaped housing, and the suspension facilitates suspension of the triangular or T-shaped housing from a crane. At least a concrete/steel pulverizer apparatus is pivotably supported by the triangular or T-shaped housing, and the concrete/steel pulverizer apparatus comprises a pair of concrete/steel pulverizer arms for engaging with a desired section of a concrete/steel structure and pulverizing the same. The concrete/steel structure disassembling apparatus incorporates its own completely independent power module for supplying (Continued)

hydraulic power to the concrete/steel pulverizer apparatus and controlling operation of the at least one pair of concrete/steel pulverizer arms, and the power module is supported by the triangular or T-shaped housing.

19 Claims, 6 Drawing Sheets

(51) Int. Cl.
*B02C 1/06* (2006.01)
*B23D 17/06* (2006.01)
*B66C 17/00* (2006.01)
*B66C 17/04* (2006.01)
*E04G 23/08* (2006.01)
*F15B 15/18* (2006.01)

(52) U.S. Cl.
CPC .............. *B66C 17/00* (2013.01); *B66C 17/04* (2013.01); *E04G 23/082* (2013.01); *B02C 2201/02* (2013.01); *F15B 15/18* (2013.01); *Y10T 225/371* (2015.04)

(58) Field of Classification Search
USPC ............................................................ 299/42
See application file for complete search history.

(56) References Cited

U.S. PATENT DOCUMENTS

| | | | | |
|---|---|---|---|---|
| 6,092,290 | A | * | 7/2000 | Vogelsanger .......... B23D 17/00 30/228 |
| 2016/0167819 | A1 | * | 6/2016 | Nakai ....................... B02C 1/00 241/266 |

FOREIGN PATENT DOCUMENTS

JP          2003184321 A  *  7/2003
JP          2013155544 A  *  8/2013

OTHER PUBLICATIONS

English translate (JP2003184321A), retrieved date Jan. 6, 2022.*
English translate (JP2013155544A), retrieved date Jan. 7, 2022.*
English translate (EP2787148A1), retrieving date Oct. 24, 2022.*

* cited by examiner

SELF-POWERED CONCRETE/STEEL STRUCTURE DISASSEMBLING APPARATUS

FIELD OF THE INVENTION

The present invention relates to a concrete/steel structure disassembling apparatus which is self-powered so that when the self-powered concrete/steel structure disassembling apparatus is suspended from a crane, or some other (hydraulically) actuated arm, the concrete/steel structure disassembling apparatus can clamp to a desired section of the concrete/steel structure to be demolished, and pulverize, sheared, cut, separate and/or remove that section of concrete/steel structure from a remainder of the concrete/steel structure to be demolished and, thereafter, release that pulverized or sheared section of concrete/steel structure so that it may fall to the ground. The concrete/steel structure disassembling apparatus also typically includes a mechanism for adjusting a center of gravity of the concrete/steel structure disassembling apparatus, during use, to improve engagement of a desired tool of the self-powered concrete/steel structure disassembling apparatus with the desired section of the concrete/steel structure to be removed.

BACKGROUND OF THE INVENTION

Concrete/steel disassembling devices are well known in the art and are utilized for a variety of different applications. These disassembling devices are, for example, typically fixed to the end of a mechanical arm or boom of a heavy equipment base, motorized piece of equipment, or some other similar heavy duty vehicle. However, with respect to all such known prior art concrete/steel disassembling devices, the operating power is typically supplied by a power source that is mounted at the base of the equipment a considerable distance away from the disassembling device but interconnected therewith via one or more hydraulic lines. That is, typically hydraulic power is delivered to the remote concrete/steel disassembling device via hydraulic lines that extend from the hydraulic pump, which is mounted on and driven by the engine or motor of the piece of equipment or heavy equipment, to the remotely located concrete/steel disassembling device.

Since the known concrete/steel disassembling devices are fixed directly to the end of a mechanical arm or a boom, and the operating power of these concrete/steel disassembling devices is supplied by a power source mounted on the base equipment or motorized equipment, and the reach or range of operation of these disassembling devices is limited by the length of the mechanical arm or boom. The limited range of operation of known concrete/steel disassembling devices prevents utilization of these such devices on relatively tall concrete/steel structures, especially structures which have limited or no access thereto. Furthermore, due to the rigidity of the connection between the known concrete/steel disassembling device and the mechanical arm or boom, the forces and torques placed on the mechanical arm or boom by the weight of the removed concrete/steel structure may cause damage to the mechanical equipment and also limit the work capacity of the heavy equipment base or the motorized equipment.

In addition, many of the known prior art concrete/steel disassembling devices are somewhat difficult for an operator to maneuver due to lack of visibility of the concrete/steel disassembling device during use.

SUMMARY OF THE INVENTION

Wherefore, it is an object of the present invention to overcome the above mentioned shortcomings and drawbacks associated with the prior art.

A further object of the present disclosure is to provide the concrete/steel structure disassembling apparatus with its own integrated source of hydraulic operating power so that all of the hydraulic requirements, for powering the associated components of the concrete/steel structure disassembling apparatus, are supplied directly by a hydraulic power source that is totally and completely incorporated and integrated into the concrete/steel structure disassembling apparatus. In other words, the concrete/steel structure disassembling apparatus, according to the present disclosure, is completely self powered and can operate without being connected to a source of power that is remote from the concrete/steel structure disassembling apparatus. That is, no additional power for operation of the concrete/steel structure disassembling apparatus is delivered to the concrete/steel structure disassembling apparatus from the crane or any other external device, for example, by hydraulic lines, electrical cables or the like.

Another object of the present disclosure is to equip the concrete/steel structure disassembling apparatus with a radio control receiver which communicates wirelessly, via radio signals, with a radio control transmitter typically located within an operator cabin at the base of the crane. The operator is thus able to send desired commands, e.g., start the engine, rotate concrete/steel pulverizer apparatus and/or metal shearing apparatus in a desired direction, rotate concrete/steel structure disassembling apparatus relative to the hook, etc., from the transmitter to the receiver in order to control remotely operation of the concrete/steel structure disassembling apparatus. The concrete/steel pulverizer apparatus and/or the metal shearing apparatus can be hydraulically actuated, by remote control, so as to rotate and steer the concrete/steel structure disassembling apparatus when suspended from the crane.

A still further object of the present disclosure is to pivotably mount a concrete/steel pulverizer apparatus and/or a metal shearing apparatus to the concrete/steel structure disassembling apparatus framework and permit the orientation of the concrete/steel pulverizer apparatus and/or the metal shearing apparatus to be manipulated, during operation, to assist with engagement with a desired section of the concrete/steel structure to be pulverized or sheared as well as assist with dropping that pulverized or sheared section of the concrete/steel structure onto the ground.

Another object of the present disclosure is to provide the concrete/steel structure disassembling apparatus with an alterable center of gravity to assist with both engagement of the concrete/steel structure disassembling apparatus with a desired section of the concrete/steel structure to be pulverized or sheared as well as dropping that pulverized or sheared section of the concrete/steel structure onto the ground.

Yet another object of the present disclosure is to provide the concrete/steel structure disassembling apparatus with at least one camera, which communicates wirelessly with a display device, and facilitates viewing of the concrete/steel structure disassembling apparatus, during operation thereof by an operator, to assist with accurate manipulation of the concrete/steel structure disassembling apparatus by the operator with a desired section of the concrete/steel structure to be pulverized and/or sheared.

The present disclosure also relates to a concrete/steel structure disassembling apparatus comprising: a housing which has a first housing coupling facilitating suspension of the housing from a crane; a second housing coupling of the housing supporting a pivotable first body, a first piston/cylinder controlling pivoting movement of the pivotable first body relative to the housing, and the pivotable first body facilitating attachment of a first disassembling apparatus thereto; a third housing coupling of the housing supporting a pivotable second body, a second piston/cylinder controlling pivoting movement of the pivotable second body relative to the housing, and the pivotable second body facilitating attachment of a second disassembling apparatus thereto; and the concrete/steel structure disassembling apparatus incorporating a completely independent power module for supplying hydraulic power to at least one of the first and the second disassembling apparatuses for controlling operation thereof, and the power module being supported by the housing.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description of the disclosure, which should be read in conjunction with the appended drawings. It is to be appreciated that the following detailed description of various embodiments is by way of example only and is not meant to limit, in any way, the scope of the present invention.

Figures 1, 2:
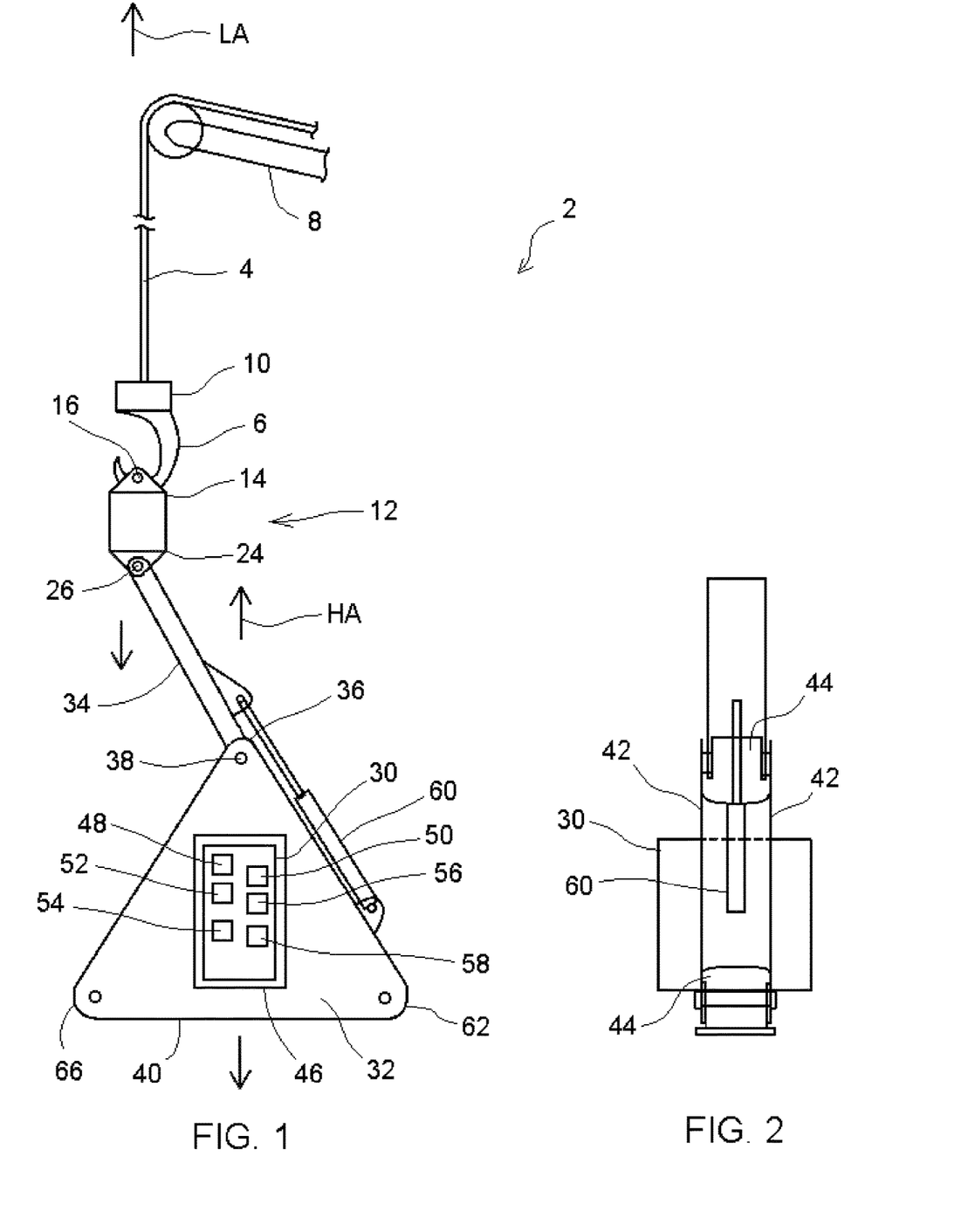
FIG. 1 is a diagrammatic front view showing the suspension arm and the triangular housing of the concrete/steel structure disassembling apparatus, according to the disclosure, prior to either a concrete/steel pulverizer apparatus, a metal shearing apparatus, or some other desired concrete/steel structure disassembling tool being attached to the triangular housing.
FIG. 2 is a diagrammatic right side elevational view of the suspension arm and the triangular housing of the concrete/steel structure disassembling apparatus shown in FIG. 1.
Figure 3:
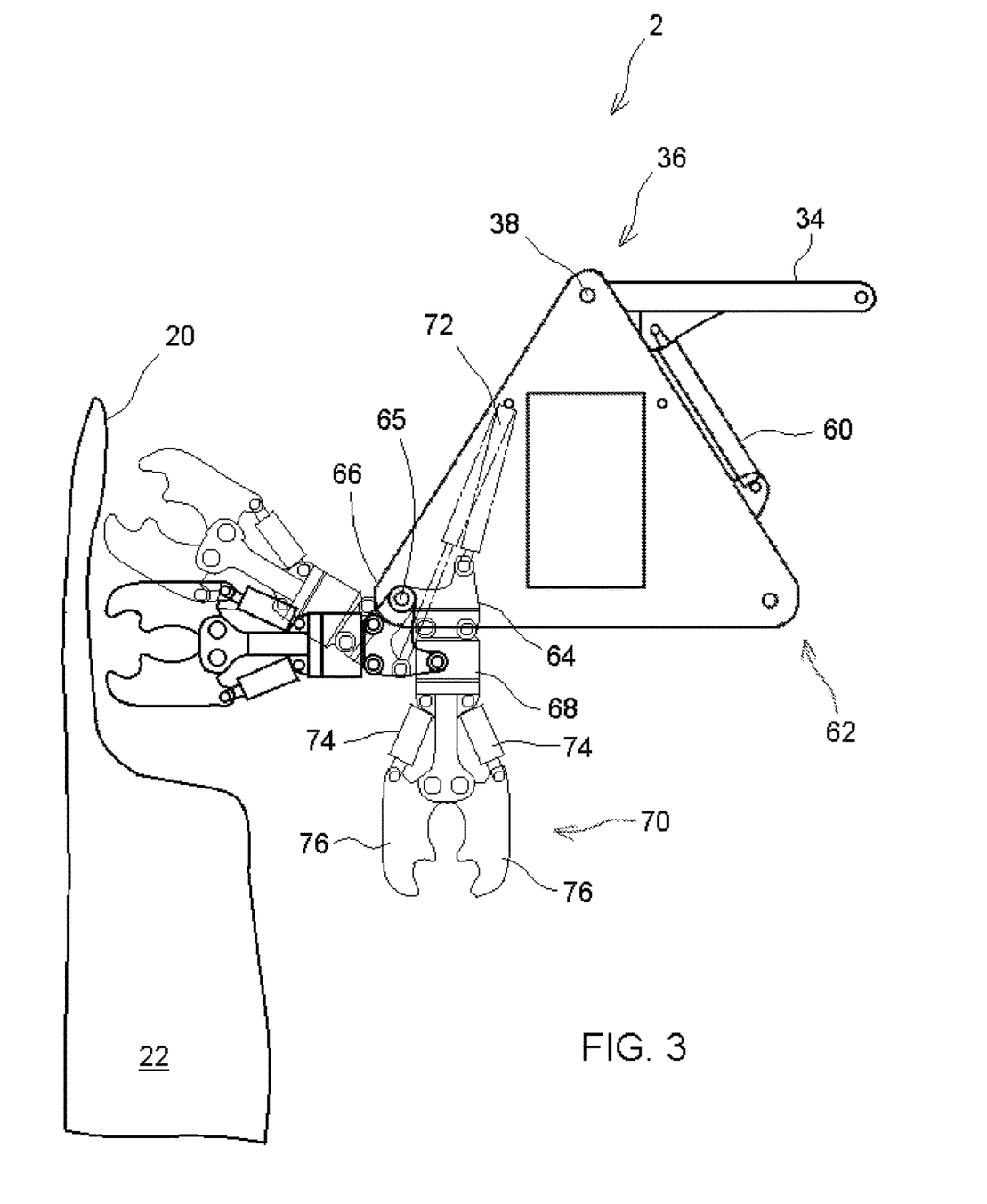
FIG. 3 is a diagrammatic front view showing a first embodiment of the concrete/steel structure disassembling apparatus, according to the disclosure, shown with a concrete/steel pulverizer apparatus pivotably supported adjacent a second housing coupling of the triangular housing.

Turning first to FIGS. 1-3, a brief description concerning the various components of the present invention will now be briefly discussed. As can be seen in this embodiment, the present invention relates to a concrete/steel structure disassembling apparatus 2 which can be suspended, via a conventional cable 4 and a conventional hook 6, from a conventional crane or some other piece of equipment having a hydraulically actuated arm, jib or crane 8. As there are a number of different types of mechanical arms, booms, jibs and cranes for suspending the concrete/steel structure disassembling apparatus 2, the following description will simply refer to all such equipment as a crane 8. As is typical in the art, a rotatable swivel 10 (only diagrammatically shown) may be is installed between the end of the cable 4 and the hook 6 so as to permit the hook 6 to rotate relative to the cable 4 during operation.

It is to be appreciated that a non-electrically conductive rotatable swivel or sling 10 can utilized between the concrete/steel structure disassembling apparatus 2 and the crane 8 such that if, for some unintended reason, either the concrete/steel structure disassembling apparatus 2 or the concrete/steel pulverizer apparatus and/or the metal shearing apparatus, supported by the concrete/steel structure disassembling apparatus 2, inadvertently contacts or touches a power line during operation, the non-electrically conductive sling will prevent any electricity from flowing along the concrete/steel pulverizer apparatus, the metal shearing apparatus and/or the concrete/steel structure disassembling apparatus 2, etc., through the non-electrically conductive swivel or sling and along the cable 4 to the crane 8 and thereby avoid possible electrocution of the operator of the concrete/steel structure disassembling apparatus 2.

As generally shown, the concrete/steel structure disassembling apparatus 2 comprises a conventional hydraulic rotator 12 which facilitates coupling of the concrete/steel structure disassembling apparatus 2 to the conventional hook 6 of the crane 8, for example, or some other suspension mechanism and helps to steer the concrete/steel structure disassembling apparatus 2 relative to the crane 8. The hydraulic rotator 12 comprises an upper section 14 which comprises a first pin or member 16 which extends between a pair of side walls or plates of the upper section 14 of the hydraulic rotator 12. The hook 6 of the crane 8 engages with the first pin or member 16 in order to suspend the concrete/steel structure disassembling apparatus 2 and thus assist with controlling vertical as well as sideway movement of the concrete/steel structure disassembling apparatus 2 relative to the ground or a section 20 of a concrete/steel structure 22 to be pulverized or sheared, with only a portion of the concrete/steel structure to be sheared 22 being shown in FIG. 3.

A lower section 24 of the hydraulic rotator 12 has a second pin or member 26 which extends between the pair of side walls or plates of the lower section 24 of the hydraulic rotator 12. The lower section 24 of the hydraulic rotator 12 is either directly connected to a T-shaped or triangular housing 32, which typically supports a power module 30 (discussed below in further detail) of the concrete/steel structure disassembling apparatus 2, so that the hydraulic rotator 12 can intermittently receive a supply of hydraulic fluid therefrom, or, as shown, connected thereto via an optional suspension arm or member 34. When a first supply of hydraulic fluid is supplied along a first supply line to the lower section 24 of the hydraulic rotator 12, the lower section 24 of the hydraulic rotator 12 rotates or turns in a first rotational direction (e.g., clockwise) relative to the upper section 12 of the hydraulic rotator 12. However, when a second supply of hydraulic fluid is supplied along a second supply line to the lower section 24 of the hydraulic rotator 12, the lower section 24 of the hydraulic rotator 12 rotates or turns in an opposite second rotational direction (e.g., counter clockwise) relative to the upper section 14 of the hydraulic rotator 12. Such rotation of the lower section 24 of the hydraulic rotator 12, relative to the upper section 14 of the hydraulic rotator 12, permits the operator to manipulate, induce, steer and/or suggest desired rotation of the concrete/steel structure disassembling apparatus 2, relative to the concrete/steel structure to be pulverized or sheared 22, so as to achieve a desired engagement position and/or orientation with an appropriate device supported by the concrete/steel structure disassembling apparatus 2. Such manipulation thereby assists the concrete/steel structure disassembling apparatus 2 with engaging with a desired section 20 of the concrete/steel structure to be pulverized or sheared 22.

As shown, a first upper end of the suspension arm or member 34 may be pivotally connected to the second pin or member 26 of the lower section 24 of the hydraulic rotator 12 and this second pin or member 26 generally defines a disassembling apparatus pivot axis about which the concrete/steel structure disassembling apparatus 2 can pivot back and forth, during operation, as will be discussed below in further detail. A second end of the suspension arm or member 34 is connected adjacent a first housing coupling 36 of a triangular housing 32 of the concrete/steel structure disassembling apparatus 2. Alternatively, the optional suspension arm or member 34 may be eliminated and the first housing coupling 36 of the triangular housing 32 may be directly pivotally connected to the second pin or member 26 of the lower section 24 of the hydraulic rotator 12 (not shown).

It is to be appreciated that the overall axial length of the suspension arm or member 34 can be changed, depending upon the particular application, by merely replacing the installed suspension arm or member 34 with either a longer or shorter suspension arm or member 34. For example, if it is desirable for the suspension arm or member 34 to have a longer total axial length or a lower center of gravity, then a longer suspension arm or member 34 is selected so as to increase the overall total length of the suspension arm or member 34. Alternatively, if it is desirable for the suspension arm or member 34 to have a shorter total axial length or a higher center of gravity, then a shorter suspension arm or member 34 is selected so as to shorten the overall total length of the suspension arm or member 34.

The overall axial length of the suspension arm or member 34 typical ranges from a minimal axial length of about a few feet or so to a maximum axial length of about 35 feet or so, more typically the overall axial length of the suspension arm or member 34 is between about 5 feet or so to a maximum axial length of about 25 feet or so. As noted above, the longer the axial length of the suspension arm or member 34, the lower the center of gravity of the concrete/steel structure disassembling apparatus. Conversely, the shorter the axial length of the suspension arm or member 34, the higher the center of gravity of the concrete/steel structure disassembling apparatus 2.

It is to be appreciated that during transportation of the concrete/steel structure disassembling apparatus 2, from one site to another site, the suspension arm or member 34 is typically adjusted, via the discussed below in further detail, to the position shown in FIG. 3 so that the concrete/steel structure disassembling apparatus 2 will have its shortest total axial length and thereby facilitate transport thereof.

As generally shown, at least one conventional fastener 38 pivotably connects the lower end of the suspension arm or member 34 to the upper first housing coupling 36 of the triangular housing 32. Such pivotably connection permits a bottom surface 40 of the triangular housing 32 (see FIGS. 1 and 5, for example) to be normally positioned generally parallel to the ground during operation. The triangular housing 32 typically comprises a pair of spaced apart triangular-shaped metal plates 42 (see FIG. 2, for example) which are interconnected with one another by a number of cross support members 44 so as to form a rigid support structure which is suitably sized and shaped to accommodate the power module 30 as well as accomplish the desired demolition operation described herein in further detail.

Figure 4:
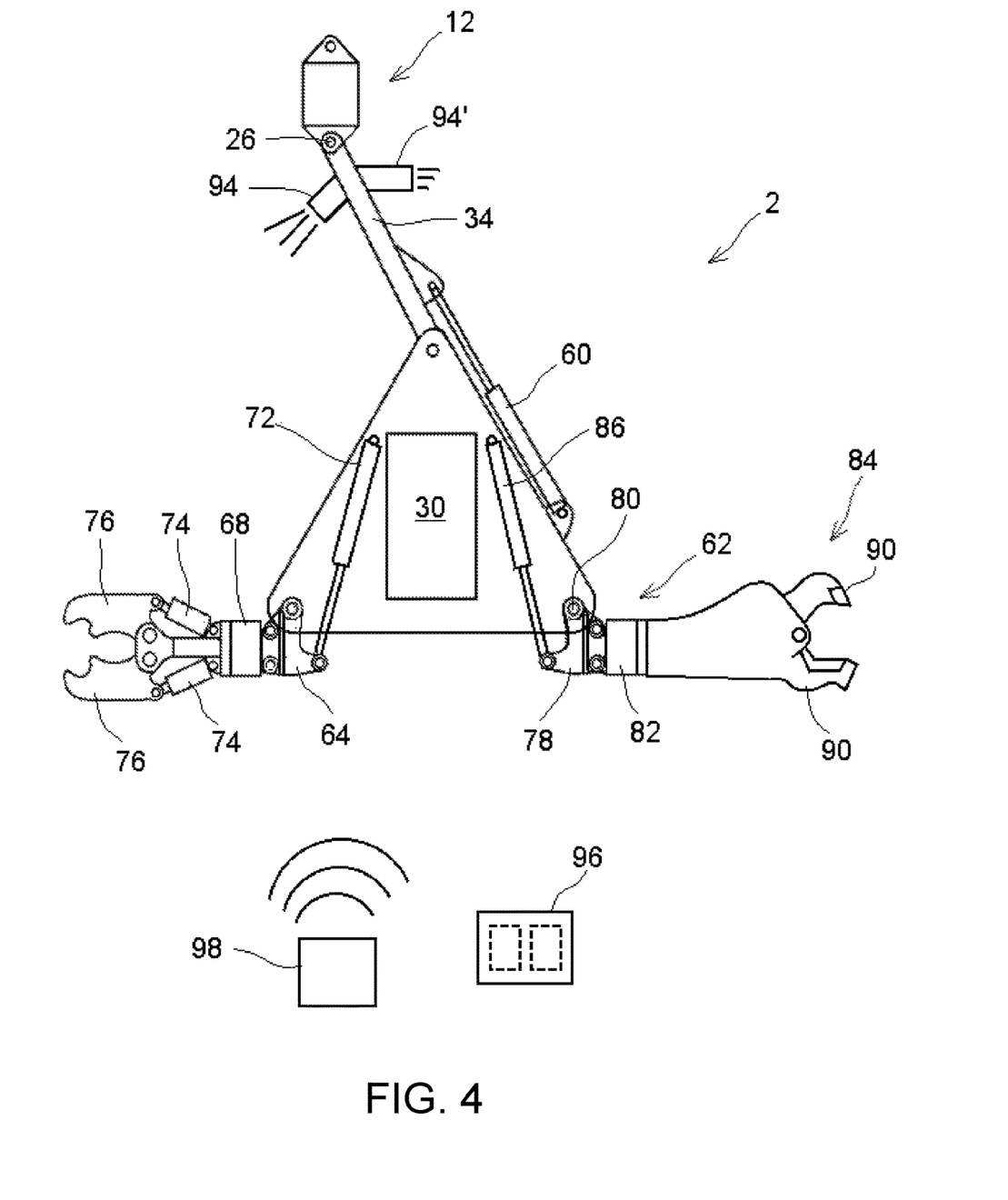
FIG. 4 is a diagrammatic front view showing a modification of the concrete/steel structure disassembling apparatus, according to the disclosure, with a concrete/steel pulverizer apparatus shown supported adjacent a second housing coupling of the triangular housing, and a metal shearing apparatus shown supported adjacent a third housing coupling of the triangular housing.
Figure 5:
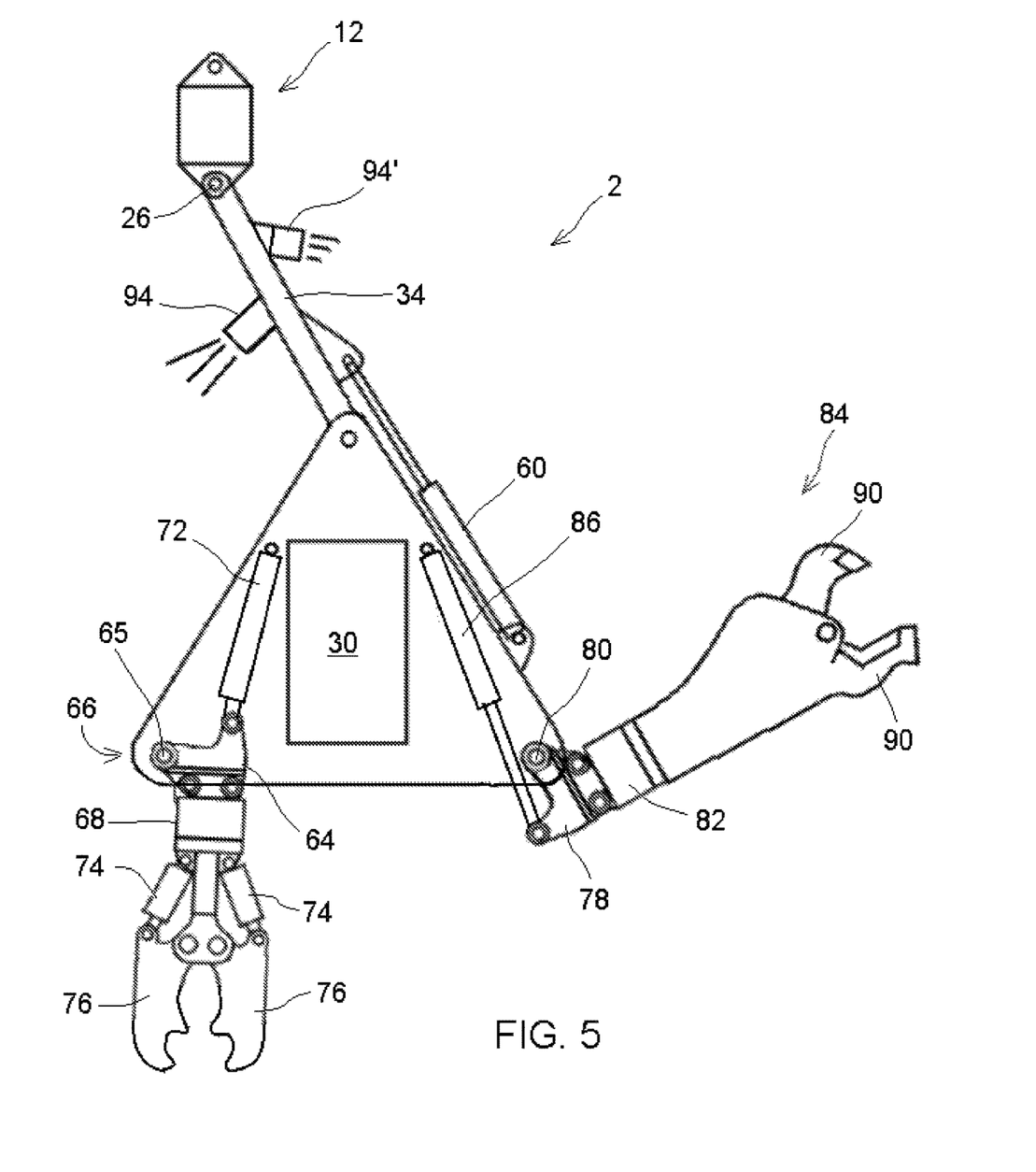
FIG. 5 is a diagrammatic front view of the concrete/steel structure disassembling apparatus of FIG. 4 showing the concrete/steel pulverizer apparatus and the metal shearing apparatus of FIG. 4 both shown pivoted into different positions.
Figure 6:
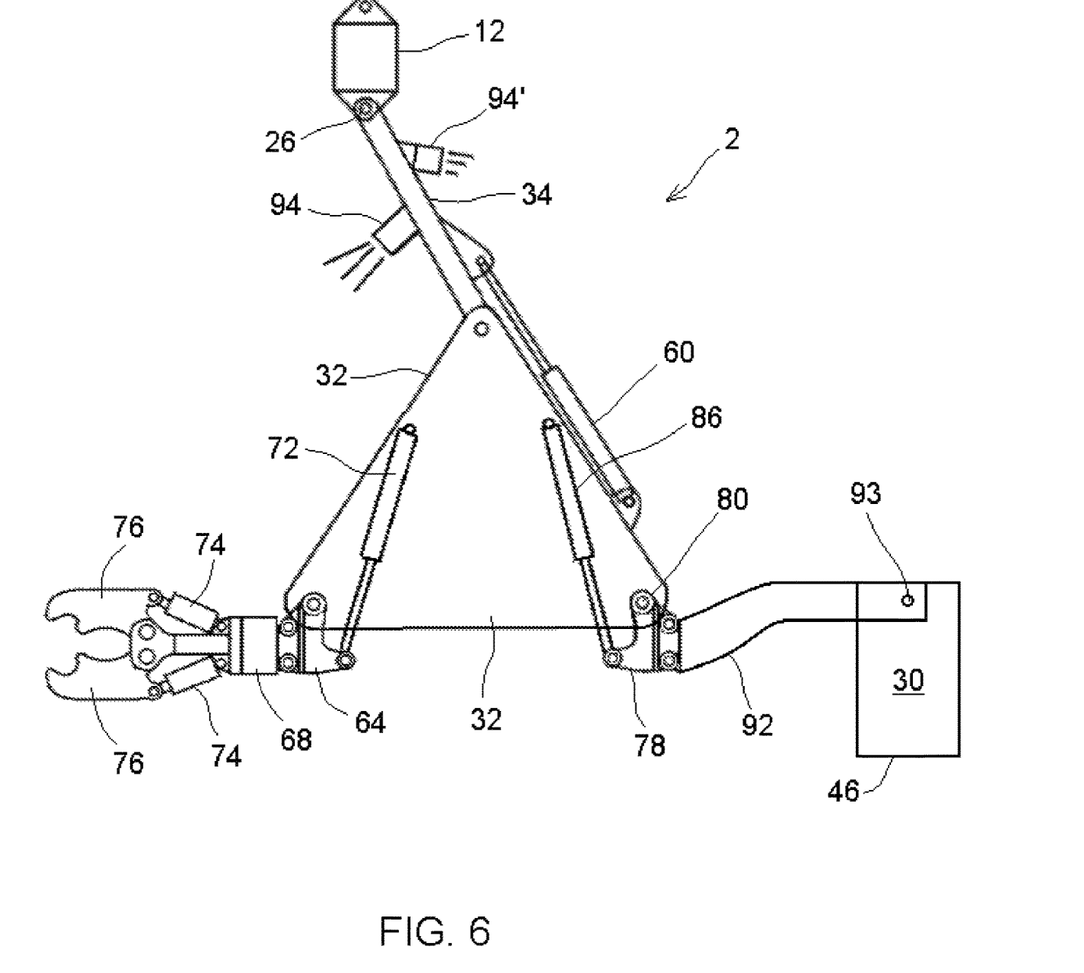
FIG. 6 is a diagrammatic front view showing a further embodiment of the concrete/steel structure disassembling apparatus, according to the disclosure, supporting a concrete/steel pulverizer apparatus, adjacent the second housing coupling of the triangular housing, and the power module pivotably being supported, adjacent the third housing coupling of the triangular housing, to assists with adjusting the center of gravity of the concrete/steel structure disassembling apparatus.

The triangular housing 32 typically includes a power module support 46, which supports the various components of the power module 30 at least partially within the triangular housing 32, as shown in FIGS. 1-5 and 7, or outside and spaced from the triangular housing 32 as shown in FIG. 6. The power module 30 generally comprises a power plant 48 such as either a combustion (gas or diesel) engine or an electric motor or combination thereof (e.g., a 10-200 hp motor for example). In addition, the power module 30 also includes a hydraulic pump 50 which is driven by the power plant 48 in order to generate a supply of hydraulic fluid, a hydraulic oil reservoir 52 hydraulically coupled to the hydraulic pump 50, at least one directional valve 54 for controlling the flow of the hydraulic fluid from the hydraulic pump 50 to the various hydraulic components of the concrete/steel structure disassembling apparatus 2, a fuel/power supply 56, e.g., a (gas or diesel) fuel tank for powering either the engine, or a battery or set of batteries for powering the electric motor, and a control unit 58 which receives control signals from the operator for controlling operation of the concrete/steel structure disassembling apparatus 2, as discussed below in further detail. All of these components of the power module 30 (power module components), for example the power plant 48, the hydraulic pump 50, the oil reservoir 52, the directional valve 54, the fuel/power supply 56, and the control unit 58, etc., are only diagrammatically shown in FIGS. 1-6 and are either mounted on or supported by the triangular housing 32.

Since the power module 30 is directly supported by the concrete/steel structure disassembling apparatus 2, the concrete/steel structure disassembling apparatus 2 is considered to be "self powered." That is to say, in other words, that no addition power/energy is transferred or received from the crane, or any other external source, along an arm, a boom or a jib 8 of the crane to the concrete/steel structure disassembling apparatus 2 during operation. As such, no power lines, hydraulic lines, electrical cables and/or the like need are connected between the concrete/steel structure disassembling apparatus 2 and the crane 8, for example, in order to facilitate operation of the concrete/steel structure disassembling apparatus 2.

In the embodiments shown in FIGS. 1-5, the power module support 46 is fixedly mounted to the triangular housing 32, as diagrammatically shown in those figures, to prevent any movement of the power module 30 relative to the triangular housing 32. In the embodiment shown in FIG. 6, the power module support 46 is pivotably or movably mounted to a third housing coupling 62 of the triangular housing 32, as diagrammatically shown in that figure, to facilitate movement of the power module 30, relative to the triangular housing 32, and thereby adjust the center of gravity of the concrete/steel structure disassembling apparatus 2 during operation.

As shown in FIGS. 1-3, an apparatus piston/cylinder 60 interconnects a lower section of the suspension arm or member 34 with a section of the triangular housing 32 adjacent the third housing coupling 62. The apparatus piston/cylinder 60 is a linear hydraulic piston/cylinder and is connected to the hydraulic pump 50 of the power module 30, via a pair of hydraulic lines, to facilitate controlling operation thereof. When hydraulic fluid is supplied, via one of the hydraulic lines, to one end of the cylinder of the apparatus piston/cylinder 60, an overall length of the apparatus piston/cylinder 60 is increased and the suspension arm or member 34 is moved into alignment with one side edge of the triangular housing 32, as generally shown in FIG. 1, and thereby moving the center of gravity of the concrete/steel structure disassembling apparatus 2 toward the right. Alternatively, when hydraulic fluid is supplied, via the other one of the hydraulic lines, to an opposite end of the cylinder of the apparatus piston/cylinder 60, the overall length of the apparatus piston/cylinder 60 is thereby moved to is shorter most position, as shown in FIG. 3, which thereby moves the center of gravity of the concrete/steel structure disassembling apparatus 2 toward the left.

The apparatus piston/cylinder 60 is generally able to tilt, pivot or move the triangular housing 32 as well as each of the supported assemblies, relative to the suspension arm or member 34, over a range of motion of about 115°±20° or so. Such tilting movement of the apparatus piston/cylinder 60 assists with changing/modifying the center of gravity of the concrete/steel structure disassembling apparatus 2 so that the concrete/steel structure disassembling apparatus 2 can more easily engage with a desired section 20 of the concrete/steel structure 22 to be pulverized or sheared and, thereafter, release that pulverized or sheared section 20 onto the ground.

A concrete/steel pulverizer body 64 is pivotally connected, via a concrete/steel pulverizer body pivot pin (hinge) 65, to the second housing coupling 66 of the triangular housing 32 so as to facilitate pivoting movement of the concrete/steel pulverizer body 64 relative to the triangular housing 32 about the body pivot axis defined by the body pivot pin 65. A first stationary portion of a conventional concrete/steel pulverizer rotating device 68 is fixed to a free end of the concrete/steel pulverizer body 64 while a rotatable second portion of the concrete/steel pulverizer rotating device 68 is rotatable relative to the first portion of the conventional concrete/steel pulverizer rotating device 68. A conventional concrete/steel pulverizer apparatus 70, which is described below in further detail, is rotatably supported by the opposite second end of the concrete/steel pulverizer rotating device 68.

The concrete/steel pulverizer body 64 is pivotable relative to the second housing coupling 66 of the triangular housing 32 about the body pivot axis by a pulverizer piston/cylinder 72 that interconnects a section of the triangular housing 32, adjacent the first housing coupling 36, with a free end of the concrete/steel pulverizer body 64 (see FIG. 3). The pulverizer piston/cylinder 72 is a linear hydraulic piston/cylinder and is connected to the hydraulic pump 50 of the power module 30, via a pair of hydraulic lines, to facilitate operation thereof. When hydraulic fluid is supplied to a first end of the cylinder of the pulverizer piston/cylinder 72, via one of the pair of hydraulic lines, an overall length of the pulverizer piston/cylinder 72 increases so that the concrete/steel pulverizer body 64 pivots the supported concrete/steel pulverizer apparatus 70 about the body pivot pin 65, relative to the second housing coupling 66 of the triangular housing 32, toward the suspension arm or member 34. Alternatively, when hydraulic fluid is supplied to an opposite second end of the cylinder of the pulverizer piston/cylinder 72, via the other one of the pair of hydraulic lines, the overall length of the pulverizer piston/cylinder 72 thereby decreases so that the concrete/steel pulverizer body 64 pivots about the body pivot pin 65, relative to the second housing coupling 66 of the triangular housing 32 and thus pivots the concrete/steel pulverizer apparatus 70 away from the suspension arm or member 34.

The pulverizer piston/cylinder 72 is generally able to tilt, pivot or move the concrete/steel pulverizer body 64, as well as the supported concrete/steel pulverizer apparatus 70, in a generally vertical direction over a range of motion of about 115°±20° or so. That is, the pulverizer piston/cylinder 72 is generally able to pivot the concrete/steel pulverizer body 64 to an upper position about 30° above horizontal and to a lower position about 85° below horizontal. Such tilting movement of the concrete/steel pulverizer body 64 assists the supported concrete/steel pulverizer apparatus 70 with properly engaging with a desired section 20 of the concrete/steel structure 22 to be pulverized as well as releasing any remaining debris from the pulverized section 20 onto the ground. It is to be appreciated that the concrete/steel pulverizer apparatus 70 is designed so as to be tilted by the concrete/steel pulverizer body 64 and rotatable by the concrete/steel pulverizer rotating device 68 into virtually any desired position without abutting against or contacting the triangular housing 32.

The concrete/steel pulverizer rotating device 68 facilitates rotation of the concrete/steel pulverizer apparatus 70 in either rotational direction relative to the concrete/steel pulverizer body 64, about a concrete/steel pulverizer rotational axis that is defined by the concrete/steel pulverizer rotating device 68 and which extends substantially perpendicular to the body pivot pin 65.

When a first supply of hydraulic fluid is supplied from the hydraulic pump 50 of the power module 30 to the concrete/steel pulverizer rotating device 68, via one of the pair of hydraulic lines, the concrete/steel pulverizer rotating device 68 commences rotation of the supported concrete/steel pulverizer apparatus 70 in a first rotational direction. Alternatively, when a second supply of hydraulic fluid is supplied to the concrete/steel pulverizer rotating device 68, via the other one of the pair of hydraulic lines, the concrete/steel pulverizer rotating device 68 commences rotation of the supported concrete/steel pulverizer apparatus 70 in an opposite second rotational direction.

The concrete/steel pulverizer rotating device 68 is normally equipped with a conventional rotatable hydraulic coupling which facilitates the supply of additional hydraulic fluid through the concrete/steel pulverizer rotating device 68 to the hydraulic components of the concrete/steel pulverizer apparatus 70, e.g., pulverizer arm cylinders 74, regardless of the rotated position of the concrete/steel pulverizer apparatus 70. Use of the concrete/steel pulverizer rotating device 68 for the concrete/steel pulverizer apparatus 70 enables rotation of the concrete/steel pulverizer apparatus 70 up to 360°. The purpose of the rotatable hydraulic coupling will become more apparent from the following discussion. It should be appreciated that if desired, the supply of hydraulic fluid to the hydraulic components of the concrete/steel pulverizer apparatus 70 may be transmitted via flexible hydraulic lines (not shown) that are located outside the concrete/steel pulverizer rotating device 68 rather than through the rotatable hydraulic coupling of the concrete/steel pulverizer rotating device 68. This embodiment, however, will limit rotation of the concrete/steel pulverizer apparatus 70 to less than 360°, e.g., 180°±100°.

As is well known in the art, the concrete/steel pulverizer apparatus 70 is normally equipped with a pair of hydraulically movable pulverizing arms 76, which facilitate grasping and releasing of a desired section 20 of the concrete/steel structure 22 to be pulverized during operation of the concrete/steel pulverizer apparatus 70, as discussed below in further detail. According to one application, one of the pulverizing arms 76 may be a fixed arm while the other pulverizing arm 76 may be movable toward and away from that fixed arm. Alternative, in another application as shown in the drawings, both of the pulverizing arms 76 are movable relative to one another.

As is conventional in the prior art, movement of each one of the pulverizer arms 76 is controlled by a respective pulverizer arm cylinder 74 coupling the pulverizer arm 76 to a body of the concrete/steel pulverizer apparatus 70. When hydraulic fluid is simultaneously supplied, via the rotatable hydraulic coupling or via one of the external flexible hydraulic lines, to a first side of each one of the pulverizer arm cylinders 74, the pulverizer arms 76 move in unison with respect to one another to close, grasp and pulverize a desire section 20 of the concrete/steel structure 22 located therebetween. When hydraulic fluid is simultaneously supplied, via the rotatable hydraulic coupling or via other one of the external flexible hydraulic lines, to a second side of each one of the pulverizer arm cylinders 74, the pulverizer arms 76 move in unison away from one another to open and release the desire pulverized section 20 of the concrete/steel structure 22 which, thereafter, can then fall to the ground. The pair of hydraulically movable pulverizer arms 76 cooperate with one another to clamp and/or pulverize the desired section 20 of the concrete/steel structure 22 therebetween in a conventional manner.

Although not shown in FIG. 3, it is to be appreciated that another tool, component or apparatus may be supported adjacent the third housing coupling 62 of the triangular housing 32. However, in the event that another tool, component or apparatus is not supported adjacent the third housing coupling 62 of the triangular housing 32, then the center of gravity of the embodiment shown in FIG. 3 will toward the second housing coupling 66.

Turning now to FIGS. 4 and 5, a second embodiment of the present invention will now be described. As this embodiment is very similar to the previously discussed first embodiment, generally only the differences between this new embodiment and the first embodiment will be discussed in detail while identical elements will be given identical reference numerals.

The significant difference between this embodiment and the first embodiment is the attachment of a metal shearing apparatus 84 adjacent the third housing coupling 62 of the triangular housing 32. In all other respects, the connection of the concrete/steel pulverizer apparatus 70 to the crane 8, via the suspension arm or member 34, are substantially the same as discussed above.

A second body 78 is pivotally connected, via a second body pivot pin (hinge) 80, to the third housing coupling 62 of the triangular housing 32 so as to facilitate pivoting movement of the second body 78 relative to the triangular housing 32 about the body pivot axis defined by the second body pivot pin 80. A first stationary portion of a metal shearing rotating device 82 is fixed to a free end of the second body 78 while a rotatable second portion of the metal shearing rotating device 82 is rotatable relative to the first portion of the conventional metal shearing rotating device 82. A conventional metal shearing apparatus 84, which is described below in further detail, is rotatably supported by the opposite second end of the metal shearing rotating device 82.

The second body 78 is pivotable, relative to the third housing coupling 62 of the triangular housing 32, about the shearing body pivot axis by a third piston/cylinder 86 that interconnects a section of the triangular housing 32, adjacent the first housing coupling 36, with a free end of the second body 78 (see FIGS. 4 and 5, for example). The third piston/cylinder 86 is a linear hydraulic piston/cylinder and is hydraulically connected, via a pair of hydraulic lines, to the hydraulic pump 50 of the power module 30 to facilitate operation thereof. When hydraulic fluid is supplied, via one of the pair of hydraulic lines, to a first end of the cylinder of the third piston/cylinder 86, an overall length of the third piston/cylinder 86 increases so that the second body 78 pivots the supported metal shearing apparatus 84 about the shearing body pivot pin 80, relative to the third housing coupling 62 of the triangular housing 32, toward the suspension arm or member 34. Alternatively, when hydraulic fluid is supplied, via another one of the pair of hydraulic lines, to an opposite second end of the cylinder of the third piston/cylinder 86, the overall length of the third piston/cylinder 86 thereby decreases so that the second body 78 pivots about the shearing body pivot pin 80, relative to the third housing coupling 62 of the triangular housing 32 and thus pivots the metal shearing apparatus 84 away from the suspension arm or member 34.

The third piston/cylinder 86 is generally able to tilt, pivot or move the second body 78, as well as the supported metal shearing apparatus 84, in a generally vertical direction over a range of motion of about 115°±20° or so. That is, the third piston/cylinder 86 is generally able to pivot the second body 78 to an upper position about 30° above horizontal and to a lower position about 85° below a horizontal. Such tilting movement of the second body 78 assists the supported metal shearing apparatus 84 with properly aligning and engaging with a desired metal section 20 of the concrete/steel structure 22 to be sheared from a remainder of the concrete/steel structure and, thereafter, be released to the ground. It is to be appreciated that the metal shearing apparatus 84 is designed so as to be freely tilted, by the second body 78 and rotatable by the metal shearing rotating device 82, into virtually any desired position without abutting against or contacting the triangular housing 32.

The metal shearing rotating device 82 facilitates rotation of the metal shearing apparatus 84 in either rotational direction relative to the second body 82, about a metal shearing rotational axis that is defined by the metal shearing rotating device 82 which extends substantially perpendicular to the shearing body pivot pin 80.

When a first supply of hydraulic fluid is supplied from the hydraulic pump 50 of the power module 30, via one of a pair of hydraulic lines, to the metal shearing rotating device 82, the metal shearing rotating device 82 commences rotation of the supported metal shearing apparatus 84 in a first rotational direction. Alternatively, when a second supply of hydraulic fluid is supplied, via another one of the pair of hydraulic lines, to the metal shearing rotating device 82, the metal shearing rotating device 82 commences rotation of the supported metal shearing apparatus 84 in an opposite second rotational direction.

The metal shearing rotating device 82 may be equipped with a conventional rotatable hydraulic coupling (not shown in detail) which facilitates the supply of additional hydraulic fluid through the metal shearing rotating device 82 to at least one, and possibly two, hydraulic shearing arm cylinder(s) (not shown), regardless of the rotated position of the metal shearing apparatus 84. Use of the rotatable hydraulic coupling with the metal shearing rotating device 82 enables rotation of the metal shearing apparatus 84 up to 360°. The purpose of the rotatable hydraulic coupling will become apparent from the following discussion. It should be appreciated that if desired, the supply of hydraulic fluid to the hydraulic components of the metal shearing apparatus 84 may be transmitted via flexible hydraulic lines (not shown) that are located outside the metal shearing rotating device 82 rather than through the rotatable hydraulic coupling of the metal shearing rotating device 82. This embodiment, however, will limit rotation of the metal shearing apparatus 84 to less than 360°, e.g., 180°±100°.

As is well known in the art, the metal shearing apparatus 84 normally equipped with at least one hydraulically movable shearing arm 90, which facilitate shearing of a desired metal section 20 from the concrete/steel structure 22 during operation of the metal shearing apparatus 84, as discussed below in further detail. For some applications, as generally shown in FIGS. 4 and 5, a first one of the shearing arms 90 is a fixed shearing arm while the other shearing arm 90 is movable toward and away from that fixed shearing arm 90. Alternative, for other embodiments, both of the shearing arms 90 are able to move relative to one another during the shearing operation.

As is conventional in the prior art, movement of the shearing arm(s) 90 is controlled by either one or a respective pair of shearing arm cylinder(s) (not shown in detail). When hydraulic fluid is simultaneously supplied, via the rotatable hydraulic coupling or via one of the external flexible hydraulic lines, to a first side of either one or each of the shearing arm cylinder(s), the shearing arms 90 can move in unison with respect to one another to close and shear a desire metal section 20 of the concrete/steel structure 22 located therebetween. When hydraulic fluid is simultaneously supplied, via the rotatable hydraulic coupling or via the other one of the external flexible hydraulic lines, to a second side of either one or each of the shearing arm cylinder(s), the shearing arms 90 can move in unison with respect to one another away from one another to open and release the sheared section 20 of the metal concrete/steel structure 22 which can then fall to the ground. The pair of hydraulically movable shearing arms 90 cooperate with one another to shear the desired metal section 20 from a remainder of the concrete/steel structure 22 in a conventional manner.

An electrically operated hydraulically valve and/or an emergency back up pump (not shown in detail) are provided to assist in the event of a power failure of the concrete/steel structure disassembling apparatus 2. That is, when a power failure of the power module occurs, the electrically operated hydraulically valve is automatically moved into a drainage position, e.g., by a spring, or moved by an actuation of an emergency back up pump to release a grasped section of the concrete/steel structure 22 from either the pulverizer arms 76 or the shearing arms 90. Once the pulverizer arms 76 or the shearing arms 90 are sufficiently released from the concrete/steel structure 22, thereafter the concrete/steel structure disassembling apparatus 2 can be lowered to the ground, by the operator, for servicing and/or repair.

Turning now to FIG. 6, a still further embodiment of the present invention will now be described. As this embodiment is very similar to both of the previously discussed embodiments, only the differences between this new embodiment and the previously discussed embodiments will be discussed in detail while identical elements will be given identical reference numerals.

According to this embodiment, as with the second embodiment, the second body 78 is pivotally connected, via a second body pivot pin (hinge) 80, adjacent the third housing coupling 62 of the triangular housing 32 so as to facilitate pivoting movement of the second body 78 relative to the triangular housing 32 about the body pivot axis defined by the shearing body pivot pin 80. However, according to this embodiment, the second body 78 supports a suspension leg 92 instead of the metal shearing apparatus 84.

As shown, the suspension leg 92 extends from a first end of the second body 78 while an opposite second end of the suspension leg 92 supports a power module 30. As with the previous embodiment, the second body 78 is pivotable relative to the third housing coupling 62 of the triangular housing 32 about the shearing body pivot axis 80 by the third piston/cylinder 86 that interconnects a section of the triangular housing 32, adjacent the first housing coupling 36, with a free end of the second body 78 (see FIG. 6). The third piston/cylinder 86 is a linear hydraulic piston/cylinder and is connected to the hydraulic pump 50 of the power module 30, via a pair of hydraulic lines, to facilitate operation thereof. When hydraulic fluid is supplied to a first end of the cylinder of the third piston/cylinder 86, via one of the pair of hydraulic lines, an overall length of the third piston/cylinder 86 increases so that the second body 78 pivots the suspension leg 92 and the supported power module 30 about the shearing body pivot pin 80, relative to the third housing coupling 62 of the triangular housing 32, toward the suspension arm or member 34. Alternatively, when hydraulic fluid is supplied to an opposite second end of the cylinder of the third piston/cylinder 86, via another one of the pair of hydraulic lines, the overall length of the third piston/cylinder 86 thereby decreases so that the second body 78 pivots the suspension leg 92 and the supported power module 30 about the shearing body pivot pin 80, relative to the third housing coupling 62 of the triangular housing 32, away from the suspension arm or member 34.

The third piston/cylinder 86 is generally able to tilt, pivot or move the second body 78, as well as the suspension leg 92 and the supported power module 30, in a generally vertical direction over a range of motion of about 115°±20° or so. That is, the third piston/cylinder 86 is generally able to pivot the second body 78 to an upper position about 30° above horizontal and to a lower position about 85° below horizontal. Such tilting movement of the second body 78 assists with adjusting/changing the center of gravity of the concrete/steel structure disassembling apparatus 2 when a metal shearing apparatus 84, or some other tool, device or apparatus, is not employed. That is, the power module 30 is moved from the triangular housing 32 to the free end of the suspension leg 92 to assist with changing the center of gravity of the concrete/steel structure disassembling apparatus 2.

According to one embodiment, the power module 30 is supported by the power module support 46 which is either fixedly mounted to a second end of the suspension leg 92 or, as diagrammatically shown, is pivotably suspended therefrom by a power module pivot pin 93, for example. Since there is not any need for the suspension leg 92 and the supported power module 30 to rotate relative to the housing 32, the metal shearing (second) rotating device 82 can be eliminated in this embodiment. When the power module support 46 is either pivotably mounted by the power module pivot pin 93, the power module components can swing or sway, relative to the second end of the suspension leg 92, and thus always remain in a generally vertical orientation, as shown in FIG. 6, during operation of the concrete/steel structure disassembling apparatus 2 regardless of the position and/or angle of the concrete/steel structure disassembling apparatus 2. If the power module support 46 and the associated power module components are pivotably suspended from the suspension leg 92 by the power module pivot pin 93, then the power module pivot pin 93 may be equipped with a removable locking feature (not shown) which selectively permits or eliminates any swinging or swaying motion of the power module support 46 and the associated power module components relative to the second end of the suspension leg 92.

According to one embodiment of the disclosure, the concrete/steel structure disassembling apparatus 2 supports a camera 94 to facilitate remote viewing of the concrete/steel structure disassembling apparatus 2 by an operator to assist with precise and accurate engagement of the concrete/steel pulverizer apparatus 70 with the desired section 20 of a concrete/steel structure 22 to be pulverized. The camera 94 may be supported by a conventional bracket on an upper first end of the triangular housing 32, or possibly on the suspension arm or member 34, and faces in the direction of the concrete/steel pulverizer apparatus 70. A mating display device 96 is located within the crane 8 or other piece of equipment to receive at least a wireless video signal from the camera 94 to facilitate viewing of the concrete/steel pulverizer apparatus 70 by the operator. The camera 94 and the display device 96 communicate wirelessly with one another, as is conventional and well known in the art.

It is to be appreciated that the location where the cameras 94 and 94' are attached to the concrete/steel structure disassembling apparatus 2 may vary from application to application, e.g., the cameras 94, 94' may be attached to the housing 32, the bodies 64, 78, etc. The important aspect is that each of the cameras 94, 94' facilitate accurate viewing of the respective tool coupled to the concrete/steel structure disassembling apparatus 2.

In addition, a second camera 94' may be supported by another conventional bracket on an upper first end of the triangular housing 32, or possibly on the suspension arm or member 34, and face in the direction of the metal shearing apparatus 84. A mating display device 96 is located within the crane 8 or other piece of equipment and receives at least a wireless video signal from the camera 94 or 94' to facilitate viewing operation of the metal shearing apparatus 84 by the operator.

The concrete/steel structure disassembling apparatus 2 includes a radio control receiver which can be connected to or is part of the control unit 58 of the power module 30 and which communicates wirelessly, via radio signals, with a radio control transmitter 98 typically located within an operator cabin at the base of a crane 8. The operator is able to send desired commands, e.g., start the power plant 48, rotate the concrete/steel pulverizer apparatus 70 in a desired direction, rotate the metal shearing apparatus 84 in a desired direction, rotate concrete/steel structure disassembling apparatus 2 relative to the hook 6, actuate the pulverizer arm cylinders 74, actuate the shearing arm cylinder(s), etc., from the transmitter 98 to the receiver in order to control operation of the concrete/steel structure disassembling apparatus 2.

Generally, the suspension arm or member 34, the triangular housing 32, the concrete/steel pulverizer body 64 and second body 78 form an apparatus framework of the concrete/steel structure disassembling apparatus 2. In addition, all of the components of the apparatus framework are sufficiently thick, robust and durable so as to form a rugged framework which is suitable to accomplish the concrete/steel pulverizing and/or shearing operations described herein in further detail.

The conventional hydraulic rotator 12 defines a longitudinal axis LA while the housing 32 defines a housing longitudinal axis HA. When the longitudinal axis LA of the hydraulic rotator is coincident with the housing longitudinal axis HA, the concrete/steel structure disassembling apparatus 2 is in a "neutral" position and the center of gravity is located relatively close to the longitudinal axis LA defined by the hydraulic rotator 12. When either the concrete/steel pulverizer (first) body 64 and/or the second body 78 is activated, by hydraulic fluid, so as to move the concrete/steel pulverizer apparatus 70, the metal shearing apparatus 84 or the suspended power module 30, relative to the suspension arm or member 34, such movement alters the center of gravity of the concrete/steel structure disassembling apparatus 2 and correspondingly moves the center of gravity of the concrete/steel structure disassembling apparatus 2 either toward or away from such neutral position. As a result of such change of the center of gravity, the concrete/steel structure disassembling apparatus 2 either pivots slightly upward toward the left, about the apparatus pivot axis 26, or the concrete/steel structure disassembling apparatus 2 pivots slightly upward toward the right, about the apparatus pivot axis 26. As a result of such change in the center of gravity, either the concrete/steel pulverizer apparatus 70 or the metal shearing apparatus 84 may be located closer to a concrete/steel structure to be pulverized or sheared then the remainder of the concrete/steel structure disassembling apparatus 2 and thus has an improved "attack angle", e.g., the triangular housing 32 may be inclined by an angle $\alpha$ of 2-15°. Such upward or protruding inclination of the concrete/steel structure disassembling apparatus 2 generally minimizes the possibility that other components of the concrete/steel structure disassembling apparatus 2 interfering with engagement and thereby facilitates engagement of the concrete/steel pulverizer apparatus 70 or the metal shearing apparatus 84 with a desired section 20 of the concrete/steel structure to be removed.

A jib (not shown) may be attached to the upper end of a crane 8, for example, to provide additional reach over a structure, power line, etc. The free end of the jib supports the hydraulic rotator 12 and the concrete/steel structure disassembling apparatus 2 is directly connected to the bottom portion of the hydraulic rotator 12. With the concrete/steel structure disassembling apparatus 2 directly connected to the jib, via the hydraulic rotator 12, the jib is readily able to control the precise orientation of the concrete/steel structure disassembling apparatus 2 relative to a section of a concrete/steel structure 22 to be engaged and removed. As such jibs are conventional and well known in the art, a further detail discussion concerning the same is not provided.

Figure 7:
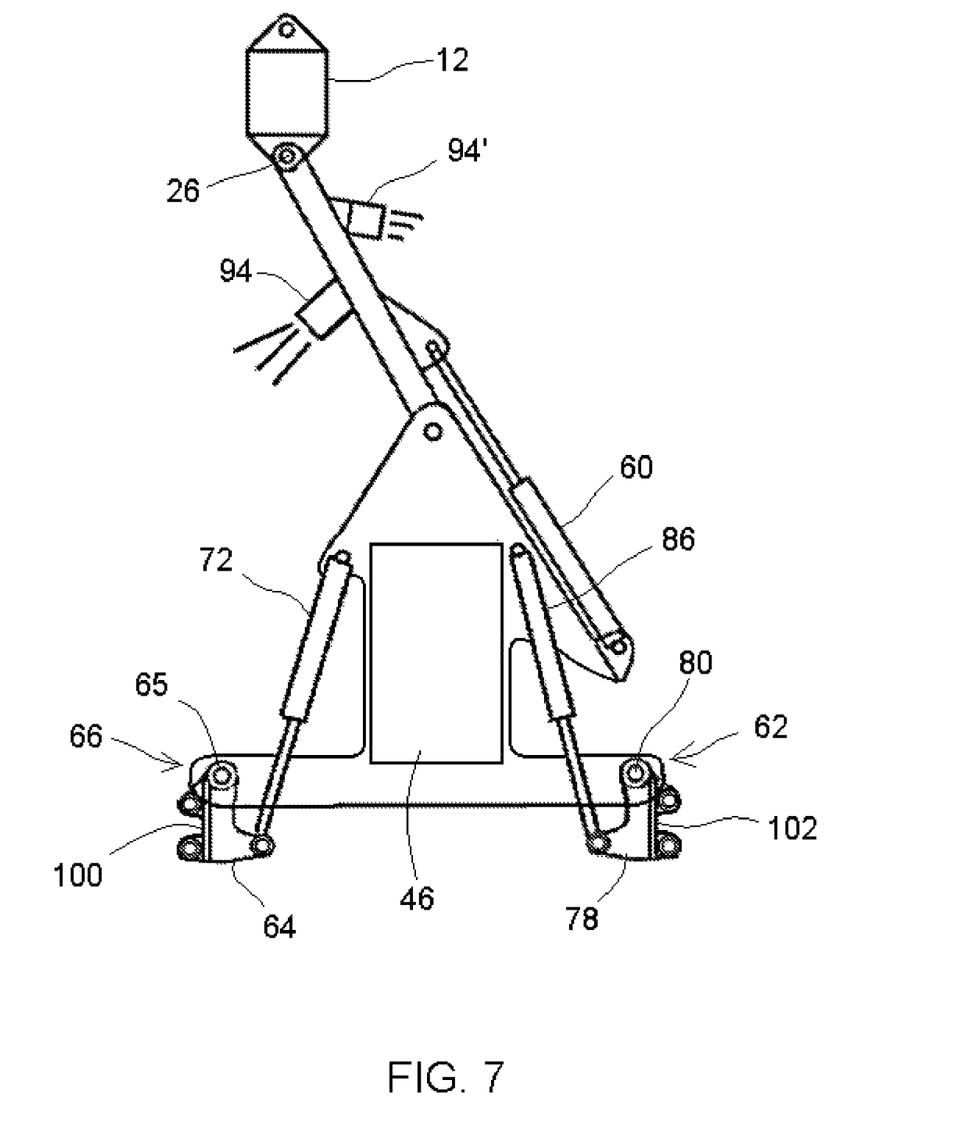
FIG. 7 is a diagrammatic front view showing a modification of the concrete/steel structure disassembling apparatus, according to the disclosure, with a first generic mounting plate shown pivotably supported adjacent a second housing coupling of the triangular housing, and a second generic mounting plate shown pivotably supported adjacent a third housing coupling of the triangular housing.

Turning now to FIG. 7, yet another embodiment of the present invention will now be described. As this embodiment is very similar to the previously discussed embodiments, only the differences between this new embodiment and the previously discussed embodiments will be discussed in detail while identical elements will be given identical reference numerals.

According to this embodiment, a first difference relates to the configuration of the housing 32 which is generally T-shaped but still includes first, second and third housing couplings 36, 66, 62 for coupling the concrete/steel structure disassembling apparatus 2 to the crane 8 and for connecting the desired tools, apparatuses to the concrete/steel structure disassembling apparatus 2. As with the previous embodiments, the power module support 46, which supports the power module 30, may be directly supported by the T-shaped housing 32 or pivotably supported adjacent one of the second or third housing couplings 66, 62 of the concrete/steel structure disassembling apparatus 2 as shown in FIG. 6.

A second difference is that the concrete/steel pulverizer (first) body 64 is also pivotally connected, via a concrete/steel pulverizer body (first) pivot pin (hinge) 65, adjacent the second housing coupling 66 of the T-shaped housing 32 so as to facilitate pivoting movement of the concrete/steel pulverizer (first) body 64 relative to the T-shaped housing 32 about the body pivot axis defined by the concrete/steel pulverizer body pivot pin (hinge) 65. According to this embodiment, however, the free end of the concrete/steel pulverizer (first) body 64 generally defines a generic mounting plate or surface 100 to which a desired tool, apparatus, device, etc., selected by the operator, can be quickly and easily attached to and removed from the generic mounting plate or surface 100. The generic mounting plate or surface 100 provides great flexibility to the operator concerning the types of tools, apparatuses, devices, etc., that can be supported by the concrete/steel structure disassembling apparatus 2 and assists with relatively rapid change from one desired tool, apparatus, device, etc., to another. As generally shown, the generic mounting plate or surface 100 has two pairs of spaced apart but aligned apertures or holes which matingly engage with a respective mounting pin for secure the desired tool, apparatus, device, etc., to the generic mounting plate or surface 102.

In addition, the second body 78 is also pivotally connected, via a second body pivot pin (hinge) 80, adjacent the third housing coupling 62 of the T-shaped housing 32 so as to facilitate pivoting movement of the second body 78 relative to the T-shaped housing 32 about the body pivot axis defined by the shearing body pivot pin 80. According to this embodiment, however, the free end of the second body 78 generally defines a generic mounting plate or surface 102 to which another desired tool, apparatus, device, etc., selected by the operator, can be quickly and easily attached to and removed from the generic mounting plate or surface 102. The generic mounting plate or surface 102 provides great flexibility to the operator concerning the types of tools, apparatuses, devices, etc., that can be supported by the concrete/steel structure disassembling apparatus 2 and assists with relatively rapid change from one desired tool, apparatus, device, etc., to another. As generally shown, the generic mounting plate or surface 102 has two pairs of spaced apart but aligned apertures or holes which matingly engage with a respective mounting pin for secure the desired tool, apparatus, device, etc., to the generic mounting plate or surface 102.

It is to be appreciated that the housing 32 can have a variety of different shapes and sizes. The important aspect is that the housing be able to suspend the concrete/steel structure disassembling apparatus 2 from the crane 8, via an upper section, and that the housing have two space apart housing couplings which facilitate connecting one or more desired tools, apparatuses, devices, etc., thereto with the power module either being fixedly supported by the housing or pivotably supported by the housing. In addition, the manipulation of the supported tools, apparatuses, devices, etc., by the operator facilitates modifying or changing the center of gravity of the concrete/steel structure disassembling apparatus 2.

Since all of the components (e.g., the power plant 48, the hydraulic pump 50, the hydraulic oil reservoir 5, the fuel/power supply 56, the control unit 58, etc.) of the power module 30 are supported by the power module support 46, it is relatively easy for the operator to change the position/location of the power module 30 by simply relocating the power module support 46. That is, the power module 30 and the power module support 46 can be positioned so as to be accommodated at least partially within the housing 32, as shown in FIGS. 1-5 and 7, or may be suspended therefrom, via the suspension leg 92, as shown in FIG. 6, or possibly be suspended without use of a suspension leg (not shown). The important aspect is that the power module 30 be supported, in some manner, by the concrete/steel structure disassembling apparatus 2 to facilitate self powering of the same with hydraulic fluid.

Operation of the Concrete/Steel Structure Disassembling Apparatus

When pulverizing or shearing of a section 20 of the concrete/steel structure is desired, the operator remotely activates the pump 50 to supply hydraulic fluid to the hydraulic rotator 12 to rotate the concrete/steel structure disassembling apparatus 2 so that a desired one of the concrete/steel pulverizer apparatus 70 or the metal shearing apparatus 84 is facing the section 20 of the concrete/steel structure 22. In addition, if desired, the center of gravity may be modified or change to improve the attack angle of the selected one of concrete/steel pulverizer apparatus 70 or the metal shearing apparatus 84. As a result in such modification or change in the center of gravity, either the concrete/steel pulverizer apparatus 70 or the metal shearing apparatus 84, for example, is located generally closer to the concrete/steel structure 22 to be pulverized or sheared then the remainder of the concrete/steel structure disassembling apparatus 2.

The operator then utilizes the camera 94, 94' to operate the crane 8 and manipulate and guide the selected concrete/steel pulverizer apparatus 70 or the metal shearing apparatus 84 into engagement with a desired section 20 of the concrete/steel structure to be pulverized or sheared. It is to be noted that the operator may rotate the lower section 24 of the hydraulic rotator 12, relative to the hook 6, in order to induce proper alignment of the concrete/steel pulverizer apparatus 70 or the metal shearing apparatus 84 with respect to the desired section 20 of the concrete/steel structure 22. As is conventional, the height of the concrete/steel pulverizer apparatus 70 or the metal shearing apparatus 84, relative to the concrete/steel structure to be sheared, can be raised or lowered by the crane 8 to select the desired pulverizing or shearing location of the concrete/steel structure 2.

Once the concrete/steel pulverizer apparatus 70 or the metal shearing apparatus 84 is located closely adjacent the desired section of the concrete/steel structure to be pulverized or sheared, hydraulic fluid is then supplied from the hydraulic pump 50 to the pulverizing arm cylinders 74 or the shearing arm cylinder(s) to actuate the pulverizing arms 76 or the shearing arm 90 simultaneously and close and pulverize or shear the desire section of the concrete/steel structure 22 therebetween. The desire section of the concrete/steel structure to be pulverized or sheared is thus clamped between the two pairs of hydraulically movable pulverizing arms 76 or shearing arm 90 of the concrete/steel pulverizer apparatus 70 or the metal shearing apparatus 84.

After the desired section of the concrete/steel structure has been sufficiently pulverized or sheared, by the hydraulically movable pulverizing arms 76 or the shearing arm 90 of the concrete/steel pulverizer apparatus 70 or the metal shearing apparatus 84, then the operator will then operate the power module 30 to supply hydraulic fluid to the pulverizing piston/cylinder 72 to open the pulverizing arms 76 and thereby release the pulverized section 20 of the metal concrete/steel structure 22, if it has not already been released, or supply hydraulic fluid to shearing arm cylinder(s) to open the shearing arms 90 and thereby release the sheared section 20 of the metal concrete/steel structure 22, if it has not already been released. Thereafter, the operator will repeatedly move the concrete/steel structure disassembling apparatus 2 back into position for another pulverizing or shearing cycle. This process is repeatedly repeated until the concrete/steel structure 22 is sufficiently dismantled.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

We claim:

1. A concrete/steel structure disassembling apparatus comprising:
   an elongate housing;
   a pivotable first body being pivotably connected adjacent a first end of the elongate housing by a second housing coupling, a first piston/cylinder connecting the pivotable first body to the elongate housing for controlling pivoting movement of the pivotable first body relative to the elongate housing, and a free end of the pivotable first body facilitating attachment of a first disassembling apparatus thereto;
   a power module being supported adjacent a second end of the elongate housing;
   a first end of a suspension arm being pivotably connected to the elongate housing, between the pivotable first body and the power module, by a first housing coupling, a second end of the suspension arm being connected, during use, to a cable of a crane to suspend the concrete/steel structure disassembling apparatus during use, and the first housing coupling facilitating pivoting movement of the suspension arm relative to the elongate housing;
   an apparatus piston/cylinder interconnecting a section of the suspension arm with the elongate housing for altering a position of the suspension arm relative to the elongate housing, when the apparatus piston/cylinder is actuated, and thereby modifying a center of gravity of the concrete/steel structure disassembling apparatus; and
   the power module supplying hydraulic power to at least the first disassembling apparatus, the first piston/cylinder apparatus and the piston/cylinder for controlling operation thereof.

2. The concrete/steel structure disassembling apparatus according to claim 1, wherein the power module is pivotably supported adjacent the second end of the elongate housing so as to be maintained in a vertical orientation during operation of the concrete/steel structure disassembling apparatus.

3. The concrete/steel structure disassembling apparatus according to claim 1, wherein a first end of a suspension leg is supported by the elongate housing while a second end of the suspension leg extends away from the elongate housing and pivotably supports the power module support.

4. The concrete/steel structure disassembling apparatus according to claim 1, wherein the first disassembling apparatus is one of a concrete/steel pulverizer apparatus and a metal shearing apparatus.

5. The concrete/steel structure disassembling apparatus according to claim 1, wherein the pivotable first body includes a rotating device which facilitates rotation of the first disassembling apparatus by up to 360° relative to the pivotably first body about a rotational axis defined by the rotating device.

6. The concrete/steel structure disassembling apparatus according to claim 1, wherein the suspension arm has an overall axial length of between a few feet and 35 feet.

7. The concrete/steel structure disassembling apparatus according to claim 1, wherein a rotator couples the second end of the suspension arm to the cable.

8. The concrete/steel structure disassembling apparatus according to claim 1, wherein a rotator couples the second end of the suspension arm to the cable, and the rotator comprises an upper section which engages with the hook, and a lower section which is coupled to the suspension arm.

9. The concrete/steel structure disassembling apparatus according to claim 1, wherein the apparatus piston/cylinder is able to tilt, pivot or move the elongate housing relative to the suspension arm over a range of motion of about 115°+20°.

10. The concrete/steel structure disassembling apparatus according to claim 1, wherein the first piston/cylinder is able to tilt, pivot or move the elongate housing relative to the suspension arm over a range of motion of about 115°+20°.

11. The concrete/steel structure disassembling apparatus according to claim 1, wherein the first piston/cylinder is able to tilt, pivot or move the elongate housing relative to the suspension arm over a range of motion which assists the supported concrete/steel pulverizer apparatus with engaging with a desired section of a structure to be pulverized as well as releasing debris therefrom onto a desired surface.

12. The concrete/steel structure disassembling apparatus according to claim 1, wherein the power module comprises:
   a power plant,
   a hydraulic pump which is driven by the power plant in order to generate a supply of hydraulic fluid,
   a hydraulic oil reservoir hydraulically coupled to the hydraulic pump,
   at least one directional valve for controlling a flow of the hydraulic fluid from the hydraulic pump to hydraulic components of the concrete/steel structure disassembling apparatus,
   one of a fuel tank or at least one battery, and
   a control unit which receives control signals from an operator for controlling operation of the concrete/steel structure disassembling apparatus.

13. The concrete/steel structure disassembling apparatus according to claim 1, wherein the power module comprises:
   one of a combustion engine or an electric motor,
   a hydraulic pump which is driven by the one of the combustion engine or the electric motor to generate a supply of hydraulic fluid,
   a hydraulic oil reservoir coupled to the hydraulic pump, and
   one of a fuel or a power supply for powering the one of the combustion engine or the electric motor.

14. The concrete/steel structure disassembling apparatus according to claim 1, wherein a bottom surface of the elongate housing is flat and the pivotable first body is supported adjacent a first end of the flat bottom surface while the power module is supported adjacent a second end of the flat bottom surface.

15. The concrete/steel structure disassembling apparatus according to claim 1, wherein the power module is pivotably supported adjacent the second end of the elongate housing by a second housing coupling.

16. The concrete/steel structure disassembling apparatus according to claim 1, wherein the elongate housing is one of T-shaped and triangularly shaped.

17. The concrete/steel structure disassembling apparatus according to claim 1, wherein a pin facilitates connection of the first end of the suspension arm with the cable.

18. A concrete/steel structure disassembling apparatus comprising:
   an elongate housing;
   a pivotable first body being pivotably connected adjacent a first end of the elongate housing by a second housing coupling, a first piston/cylinder connecting the pivotable first body to the elongate housing for controlling pivoting movement of the pivotable first body relative to the elongate housing, and a free end of the pivotable first body facilitating attachment of at least one of:
      a concrete/steel pulverizer apparatus comprising a pair of concrete/steel pulverizer arms for engaging with a desired section of a concrete/steel structure and pulverizing the same; or
      a metal shearing apparatus comprising a pair of metal sheering arms for engaging with a desired section of a metal and sheering the same;
   a power module being supported by the elongate housing;
   a first end of a suspension arm being pivotably connected to the elongate housing, between the pivotable first body and the power module, by a first housing coupling, a second end of the suspension arm facilitating connection to a cable of a crane and suspension of the concrete/steel structure disassembling apparatus during use, and the first housing coupling facilitating pivoting movement of the suspension arm relative to the elongate housing;
   an apparatus piston/cylinder interconnecting a section of the suspension arm with the elongate housing for altering a position of the suspension arm relative to the elongate housing, when the apparatus piston/cylinder is actuated, and thereby modifying a center of gravity of the concrete/steel structure disassembling apparatus; and
   the power module supplying hydraulic power to at least the first disassembling apparatus, the first piston/cylinder apparatus and the piston/cylinder for controlling operation thereof;
   wherein a pivotable second body is pivotably connected adjacent a second end of the elongate housing by a third housing coupling, a second piston/cylinder connects the pivotable second body to the elongate housing for controlling pivoting movement of the pivotable second body relative to the elongate housing, and a free end of the pivotable second body facilitating attachment of at least one of:
      the concrete/steel pulverizer apparatus comprising a pair of concrete/steel pulverizer arms for engaging with a desired section of a concrete/steel structure and pulverizing the same; or
      a metal shearing apparatus comprising a pair of metal sheering arms for engaging with a desired section of a metal and sheering the same.

19. A concrete/steel structure disassembling apparatus comprising:
   an elongate housing;
   a pivotable first body being pivotably connected adjacent a first end of the elongate housing by a second housing coupling, a first piston/cylinder connecting the pivotable first body to the elongate housing for controlling pivoting movement of the pivotable first body relative to the elongate housing, and a free end of the pivotable first body facilitating attachment of at least one of:
      a concrete/steel pulverizer apparatus comprising a pair of concrete/steel pulverizer arms for engaging with a desired section of a concrete/steel structure and pulverizing the same; or
      a metal shearing apparatus comprising a pair of metal sheering arms for engaging with a desired section of a metal and sheering the same;
   a power module being supported adjacent a second end of the elongate housing;
   a first end of a suspension arm being pivotably connected to the elongate housing, between the pivotable first body and the power module, by a first housing coupling, a second end of the suspension arm being pivotably connected, during use, to a cable of a crane to suspend the concrete/steel structure disassembling apparatus, during use, such that the concrete/steel structure disassembling apparatus is solely suspended by the suspension arm during operation, and the first housing coupling facilitating pivoting movement of the suspension arm relative to the elongate housing, and the suspension arm having an overall axial length of between a few feet and 35 feet;

a first end of an apparatus piston/cylinder being connected to a section of the suspension arm while a second end of an apparatus piston/cylinder being connected to the elongate housing to facilitate altering a position of the suspension arm relative to the elongate housing, when the apparatus piston/cylinder is actuated, and thereby modifying a center of gravity of the concrete/steel structure disassembling apparatus; and the power module supplying hydraulic power to at least the first disassembling apparatus, the first piston/cylinder apparatus and the piston/cylinder for controlling operation thereof, and the power module being pivotably supported, adjacent the second end of the elongate housing, so as to be maintained in a vertical orientation during operation of the concrete/steel structure disassembling apparatus.

\* \* \* \* \*